(12) United States Patent
Simon et al.

(10) Patent No.: US 9,860,542 B2
(45) Date of Patent: Jan. 2, 2018

(54) TRANSCODER DEVICE AND CLIENT-SERVER ARCHITECTURE COMPRISING THE TRANSCODER DEVICE

(71) Applicant: Robert Bosch GmbH, Stuttgart (DE)

(72) Inventors: Konrad Simon, Feucht (DE); Julia Ebling, Hildesheim (DE); Dieter Joecker, Burgthann (DE)

(73) Assignee: Robert Bosch GmbH, Stuttgart (DE)

( * ) Notice: Subject to any disclaimer, the term of this patent is extended or adjusted under 35 U.S.C. 154(b) by 207 days.

(21) Appl. No.: 14/970,904

(22) Filed: Dec. 16, 2015

(65) Prior Publication Data

US 2016/0173894 A1    Jun. 16, 2016

(30) Foreign Application Priority Data

Dec. 16, 2014    (DE) .................... 10 2014 226 122

(51) Int. Cl.
| | |
|---|---|
| *H04N 19/40* | (2014.01) |
| *H04N 19/85* | (2014.01) |
| *H04N 21/44* | (2011.01) |
| *H04N 5/262* | (2006.01) |
| *H04N 21/4402* | (2011.01) |

(52) U.S. Cl.
CPC .......... *H04N 19/40* (2014.11); *H04N 5/2624* (2013.01); *H04N 19/85* (2014.11); *H04N 21/4402* (2013.01)

(58) Field of Classification Search
None
See application file for complete search history.

(56) References Cited

U.S. PATENT DOCUMENTS

| | | | | |
|---|---|---|---|---|
| 2006/0050784 A1* | 3/2006 | Lappalainen | .......... | H04N 21/40 375/240.03 |
| 2009/0169102 A1* | 7/2009 | Zhang | ................... | G06T 3/4061 382/167 |
| 2012/0082343 A1* | 4/2012 | Schoeberl | ............ | H04N 19/172 382/103 |
| 2013/0064462 A1* | 3/2013 | Ninan | .............. | H04N 19/00533 382/233 |
| 2013/0215956 A1* | 8/2013 | Grembler | ......... | H04N 19/00018 375/240.02 |

(Continued)

FOREIGN PATENT DOCUMENTS

DE    102012202315    8/2013

*Primary Examiner* — Reza Aghevli
(74) *Attorney, Agent, or Firm* — Michael Best & Friedrich LLP

(57) ABSTRACT

A transcoder device. The transcoder device includes an input portion for receiving at least two encoded camera image streams and for decoding the at least two encoded camera image streams, the two camera image streams displaying different sub-sections of a monitored region, an output portion for encoding a video image stream and for outputting the encoded video image stream, and a processing portion for generating the video image stream on the basis of the at least two camera image streams. The video image stream displays a selecting portion of the monitored region, the selecting portion 15 including a sub-region of the one sub-section of the monitored region and a sub-region of the other sub-section of the monitored region which does not overlap the former sub-region.

13 Claims, 2 Drawing Sheets

(56) References Cited

U.S. PATENT DOCUMENTS

2014/0313335 A1* 10/2014 Koravadi .............. H04N 7/181
                                                    348/148
2015/0307048 A1* 10/2015 Santora ................ G08G 1/205
                                                    348/148

* cited by examiner

TRANSCODER DEVICE AND CLIENT-SERVER ARCHITECTURE COMPRISING THE TRANSCODER DEVICE

BACKGROUND OF THE INVENTION

The invention relates to a transcoder device comprising an input portion for the receipt of at least two encoded camera image streams and for decoding the at least two encoded image streams, wherein the two camera image streams, which have then been decoded, show different sub-sections of a monitored region, and comprising an output portion for encoding a video image stream and for outputting the encoded video image stream. The invention also relates to a client-server architecture comprising said transcoder device.

Video systems in the field of security technology often have a plurality of cameras which are directed at different sections of a monitored setting. The fields of vision of the cameras can be designed so as to overlap. The image streams generated are often transmitted via a network. To this end, prevailing image encoding methods, in particular image compression methods, are used in order to reduce the amount of data to be transmitted.

The German patent publication DE 10 2012 202 315 A1, which arguably forms the closest prior art, relates to a video system for displaying image data, a corresponding method and a computer program. The video system comprises a server, wherein the server comprises an encoder which can be operated as the active operating mode in a plurality of operating modes. The encoder is designed to encode video data according to the active operating mode and to output encoded transmission data. The video system further comprises a client, which can be connected to the server via a network, wherein the client is designed to request, process and to display the encoded transmission data from the encoder in one session. The encoder can also be designed as a transcoder device, wherein said device receives, decodes and recodes this encoded video data and then outputs said recoded data as transmission data.

SUMMARY OF THE INVENTION

The subject matter of the invention relates to a transcoder device which is particularly designed for a server of a client-server architecture. The transcoder device can be constituted by a hardware device and can be implemented, for example, as an electronic circuit optionally comprising a digital data processing device, such as a FPGA etc. The transcoder device can alternatively be implemented as a software module which is stored and/or run on a digital data processing device, in particular a computer, specifically the server. It is also possible for the transcoder device to be designed as a combination of hardware and software.

The transcoder device has an input portion which is designed to receive at least two encoded camera image streams and to decode the at least two encoded camera image streams from cameras. The encoding particularly relates to a compression of the camera image streams. The encoding, in particular compression, of the camera image streams can, for example, be provided by the MPEG-2 or MPEG-4 standard. The encoding particularly is carried out according to the H.264 or H.265 standard.

The transcoder device can be designed for exactly or at least two encoded camera image streams. It is thus also possible that said device is designed to receive three, four, five or more camera image streams. The at least two, particularly decoded, camera image streams display different sub-sections of a monitored region, wherein, in a particularly preferred manner, the different sub-sections form at least one joint sub-section as a full intersection. The different sub-sections particularly comprise sub-regions which are not overlapping and other sub-regions that are overlapping.

The transcoder device furthermore comprises an output portion which is designed to encode a video image stream and to output the encoded video image stream. The video image stream is generated on the basis of the two camera image streams as is explained below. The encoding particularly relates to a compression process. The same encoding and/or compression methods, as during the encoding of the camera image streams, can particularly be selected. It is however not necessary that the identical encoding and/or compression methods are used. The methods used can also differ from one another.

It is proposed within the scope of the invention that the transcoder device comprises a processing portion, which is designed to generate the video image stream on the basis of the at least two camera image streams. The video image stream generated features a selecting portion of the monitored region. The selecting portion comprises at least periodically or intermittently a sub-region of the one sub-section of the monitored region and a sub-region of the other sub-section which does not overlap with the former. The sub-region and the sub-region not overlapping with the former are particularly displayed in correct position in a joint view in the video image stream.

It is a consideration of the invention to further develop the transcoder device into an "intelligent" transcoder device for monitoring tasks. Provision is made in this regard for the processing portion to take on tasks of image processing. Provision is made in a particularly preferable manner for the processing portion to carry out a fusion of at least two camera image streams, wherein the resulting video image stream carries information from all of the at least two camera image streams. The video image stream particularly carries temporally parallel items of image information from the at least or two camera image streams. In addition, the video image stream can also optionally display sub-regions of further camera image streams, i.e. from a third or fourth or further camera image streams, besides the first two sub-regions described earlier. In so doing, it should be emphasized that the sub-regions are displayed in correct position in a joint view of the monitored region, in particular in the selecting portion of the monitored region, and/or form a joint view.

By integrating the processing portion into the transcoder device, the input portion, the processing portion and the output portion can be better coordinated to one another. Thus, camera image streams that are not currently required can, for example, not be decoded in the input portion or, in a resource saving manner, the video image stream can be generated by the processing portion in a resolution which is adapted to the resolution of a subsequent encoding by means of the output portion.

In a preferred modification to the invention, the processing portion comprises a stitching module which is designed to put the at least two camera image streams together to form a joint image data stream. Individual images of the at least two camera image streams are particularly put together at least in pairs. The joint image data stream displays a joint sub-section of the monitored region, wherein the joint sub-section preferably comprises non-overlapping sub-regions of the at least two sub-sections as well as overlapping sub-regions of the at least two sub-sections. The selecting portion is selected from the joint sub-section or is formed by the same.

By combining the at least two camera image streams into the joint image data stream, a view of the monitored region is formed which, when viewed in many cases of the format, is configured not as a rectangle, but rather as a superimposition of two rectangles or of two distorted or, respectively, rectified rectangles. This overlapping region forms the joint sub-section of the monitored region. The selecting region forms a ROI (region of interest), which can be positioned at any arbitrary position in the joint sub-section. The selecting portion can also optionally be disposed in an edge region of the joint sub-section, wherein only this edge region is shown in the video image stream. The transcoder device particularly enables the selecting portion to be defined as any arbitrary region of the joint sub-section of the monitored region and to be outputted as a video image stream.

In an alternative configuration of the invention, the processing portion comprises a model module for creating a 3D model of a modeled sub-section of the monitored region. The 3D model can, for example, be predefined as a data object by a user or be calculated on the basis of the camera image streams from the transcoder device or another module. Provision is made for the camera image streams to be projected in correct position as a surface texture onto surfaces of the 3D model. The selecting portion is selected from the modeled sub-section. Provision can particularly thereby be made for the definition of the selecting portion to be carried out by means of a virtual camera, which has any viewing angle onto the 3D model comprising the surface texture. The underlying thought is also in this case that all of the items of information for creating the 3D model are present in the transcoder device and the video image stream can be generated already in the appropriate resolution for the subsequent encoding by defining the selecting portion.

In a possible modification to the invention, the processing portion comprises any selection of the following modules:

A rectification module for rectifying the camera image streams, in particular for rectifying the images of the camera image streams, forms a possible module. The rectification module can particularly be designed to rectify the camera image streams with respect to one another; thus enabling said camera image streams to be arranged in the correct position with respect to one another, in particular perspectively correctly arranged. It is also possible for the rectification module to be designed to rectify, for example, a camera image stream of a 360 degree camera in order to make the items of image information accessible to an observer in the normal undistorted image display. The fisheye lens distortion can, e.g., be alternatively rectified.

A post-processing module represents a further module which post processes the camera image streams and implements functions, such as, e.g., super-resolution or image stabilization.

A video analysis module for the content analysis of the camera image streams forms a further possible module. It is, for example, possible to detect objects, define virtual trip wires or boundaries, to detect objects that draw attention due to the behavior thereof, etc. These different methods are also consolidated under the term VCA (video content analysis). The video analysis module particularly operates on the basis of a digital image processing.

In a particularly preferred manner, the processing portion comprises an object tracking module for tracking an object in the monitored region. The object tracking module is designed to track, e.g., a person, a motor vehicle, etc. in the monitored region. The object tracking module is optionally designed to detect and/or identify the object. In a particularly preferred manner, the object tracking module is designed to track the object across a plurality of camera image streams. A particularly preferred embodiment of the invention, which will be subsequently described, can be formed in connection with the option of defining a selecting portion.

It is particularly preferred for the transcoder device to have a control interface which is used to receive control data for defining the selecting portion, in particular in defining the position of the selecting portion in the joint sub-section or in the modeled sub-section and/or for controlling an operating mode for determining the selecting portion. The transcoder device, in particular the processing portion, can, for example, be set to an automatic object tracking, wherein the previously described object tracking module specifies a position of the object in the monitored region and the selecting portion is defined in such a way that said portion always comprises the position of the object, and therefore the video image stream resulting therefrom shows the object. Higher functionalities are integrated into the transcoder device by means of such a design.

In an alternative form or in a preferred modification to the invention, the transcoder device comprises the one or a further control interface for receiving control data for controlling the resolution of the video image stream and/or with regard to the type of encoding of the video image stream. The control interface is used to establish encoding parameters for encoding the video image stream. The resolution of the video image stream can, for example, be 320×180 pixels, 512×288 pixels and preferably up to 1920×1080 pixels. In the event that other aspect ratios are used, other control data can be used. In addition, the frame rate (FPS, frames per second) can optionally be adjusted by the transfer of further control data to the control interface. In this embodiment, the transcoder device is in position to generate the video image stream in accordance with the specifications provided by the control data.

A further subject matter of the invention relates to a client-server architecture comprising a server and at least one client. The server comprises the transcoder device as previously described. In addition, the server comprises a server output interface for outputting the encoded video image stream. The server is particularly designed as a computer, a computer farm or as a virtual server on a computer or a computer farm. The client can, for example, be designed as another computer and also alternatively or additionally as a cellular phone, smartphone, PDA, etc. The client is and/or can be connected to the server via a network arrangement, wherein a network connection is and/or can be established between client and server. Via the network arrangement, client and server can preferably bidirectionally exchange data. The network connection is especially designed as a TCP/IP connection. The client is designed to receive the encoded video image stream from the server to decode the same and, for example, to display the decoded video image stream on a monitor or display screen. To this end, the client comprises a client input interface.

It is particularly preferred for the client to be designed to transmit control data for controlling the resolution of the video image stream and/or with regard to the type of encoding of the video image stream to the server and thereby to the control interface of the transcoder device. This modification makes it possible for the client, for example on the basis of the current network connection thereof, to have control over the encoding of the video image stream and, in particular, to be able to adapt the video image stream to a present data transmission rate.

In an alternative embodiment of the invention, the server comprises an auto-configuration module, which is designed, with the aid of the network connection between the server and the client, to determine control data for controlling the resolution of the video image stream and/or with regard to the type of encoding of said video image stream, and to transmit said control data to the control interface of the transcoder device. In this embodiment, the defining of the parameters of the encoding is carried out on the server side.

In a possible modification to the invention, provision is made for the client to be designed to transmit control data for defining the selecting portion and/or for controlling an operating mode for determining the selecting portion via the server to the control interface of the transcoder device. In so doing, the client forms a remote control for the server, in particular for the transcoder device. The client can thus define which selecting portion or which operating mode the transcoder device is to implement and additionally with which type of encoding and/or resolution the video image stream is to be transmitted. As a result, it is possible to specify all of the parameters or the most important parameters for the network connection by means of the client.

In a preferred modification to the invention, the client-server architecture is designed as a video monitoring system and, for example, installed in a building, such as, e.g., a train station, a library, etc. The client-server architecture preferably comprises a plurality of cameras, for example more than ten cameras or more than 50 cameras, wherein the plurality of cameras provides a corresponding number of coded camera image streams to the transcoder device. It is also possible that a plurality of transcoder devices is provided parallel thereto, wherein the cameras are then combined into camera groups, each camera group monitoring a coherent monitored region.

A further possible subject matter of the invention relates to a method for operating the transcoder device and/or the client-server architecture.

BRIEF DESCRIPTION OF THE DRAWINGS

Further features, advantages and effects of the invention ensue from the following description of preferred exemplary embodiments of the invention as well as from the attached drawings. In the drawings.

DETAILED DESCRIPTION

Figure 1:
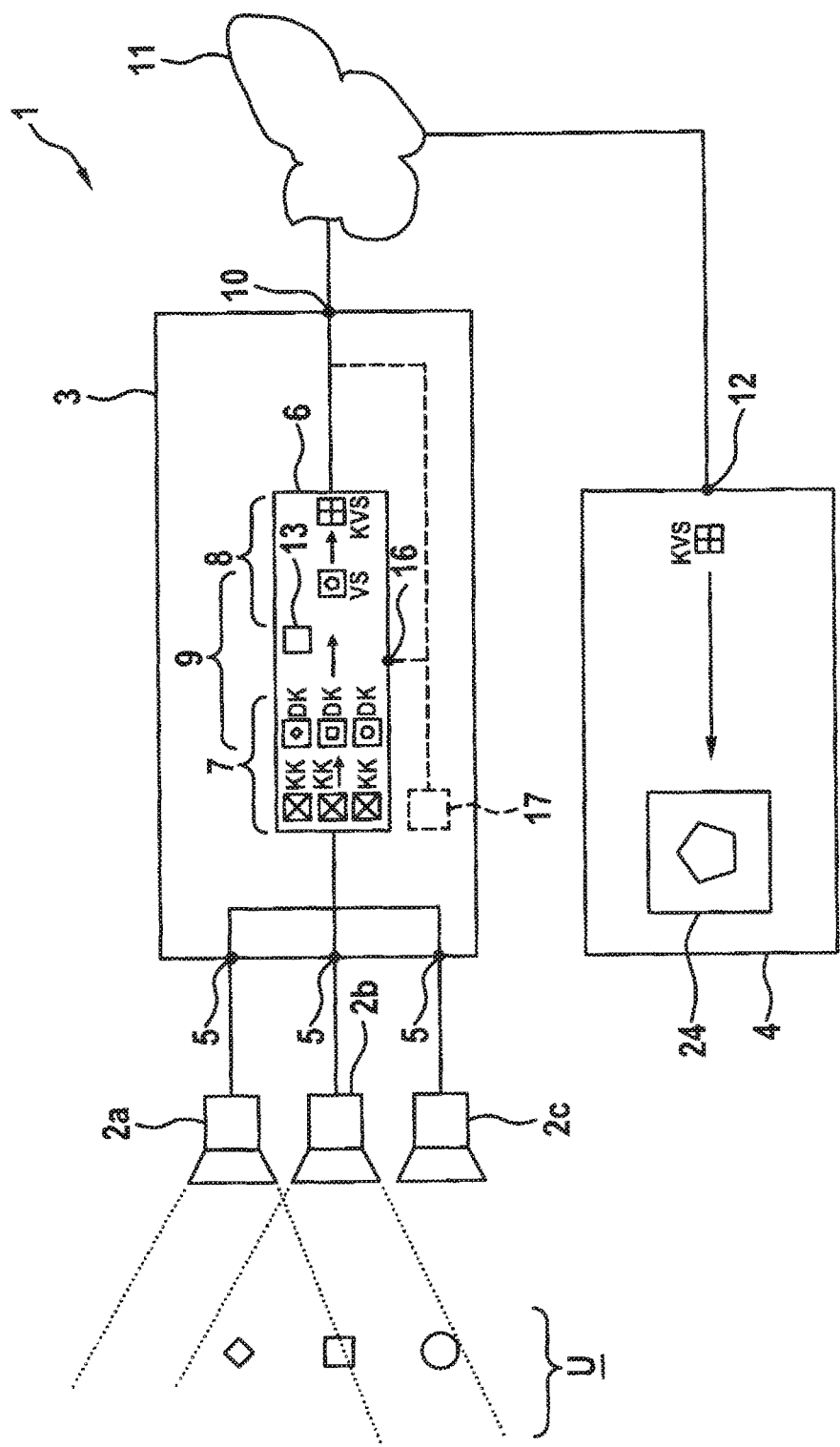
FIG. 1 shows a schematic block diagram of a client-server architecture as an exemplary embodiment of the invention.

FIG. 1 shows a client-server architecture 1 in a schematic block diagram as an exemplary embodiment of the invention. The client-server architecture 1 is designed as a video monitoring system and comprises a plurality of cameras 2a, b, c, which are directed onto a monitored region U. As depicted with regard to the upper two cameras 2a, b, the field of view of the cameras 2a, b overlap such that the cameras 2a, b monitor an overlapping sub-region and in each case a sub-region which is not covered by the other camera 2b. The client-server architecture 1 is particularly designed as a video monitoring system.

The cameras 2a, b, c are designed as network cameras and output the camera image streams as encoded camera image streams KK. The encoding takes place, e.g., by means of the H.264 standard.

The client-server architecture 1 furthermore comprises a server 3 as well as at least one client, if applicable a plurality of clients 4. The server 3 is particularly designed as a computer. It has one or a plurality of server input interfaces 5, via which the encoded camera image streams can be received. The server input interfaces 5 can, for example, be designed as one or a plurality of network interfaces.

The server 3 furthermore comprises a transcoder device 6 which is designed to receive and process the encoded camera image streams KK. In a rough structure, the transcoder device 6 comprises an input portion 7, an output portion 8 and a processing portion 9. The encoded camera image streams KK are received and decoded in the input portion 7, so that a corresponding number of decoded camera image streams DK is present in the transcoder device 6.

A video image stream VS is generated in the processing portion 9 on the basis of at least two of the decoded camera image streams DK. The generation of the video image stream VS is subsequently explained in connection with FIG. 3. The output portion 8 is used for encoding the video image stream VS; thus enabling said video image stream VS to be outputted as an encoded video image stream KVS.

The server 3 comprises a server output interface 10, via which the encoded video image stream KVS can be transferred to a network arrangement 11. The network arrangement 11 can, e.g., as a LAN form an integral component of the client-server architecture 1. The client 4 and the server 3 can alternatively be connected to the network arrangement 11. The network arrangement is particularly designed as an Internet, a LAN or something similar.

The client 4 comprises a client input interface 12 and is likewise connected to the network arrangement 11. Server 3 and client 4 are particularly connected to the network arrangement 11 in such a way that a network connection between client 4 and server 3 is established. The client 4 is designed to receive the encoded video image stream KVS. The encoded video image stream KVS can be decoded in the client 4 and displayed on a display screen 24.

Figure 2:
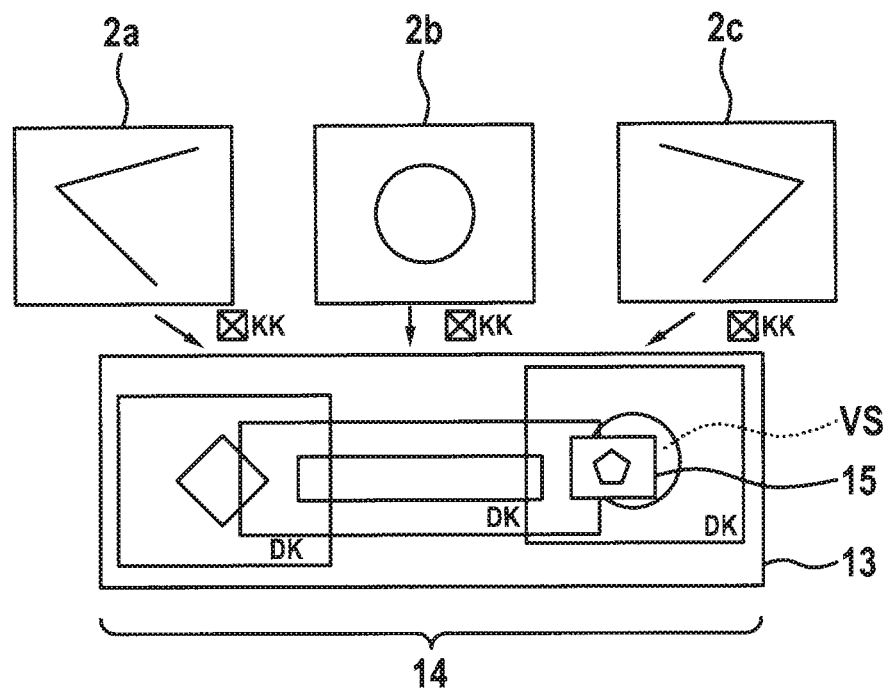
FIG. 2 shows a schematic illustration of a stitching for putting at least two camera image streams together.

In a highly schematized depiction, FIG. 2 shows an option for generating the video image stream VS. In this example, it is assumed that two of the monitoring cameras 2a, c are designed as standard cameras having a conical field of view, and a third monitoring camera 2b is designed as a so-called 360 degree camera having a viewing angle of 360 degrees.

The transcoder device 3 comprises a stitching module 13 which enables the decoded camera image streams DK of the monitoring cameras 2 to be arranged in correct position in a total view. Hence, a total view shows an overlapping and contiguous joint sub-section 14 of the monitored region U, which displays the camera image streams DK of the monitoring cameras 2a, c as well as the camera image stream DK of the 360 degree monitoring camera in a rectified manner.

The transcoder device 6 is designed, starting from the joint sub-section 14, to define a selecting portion 15, wherein the selecting portion 15 forms the content of the video image stream VS. The selecting portion 15 is put together (stitching) from a sub-region of the 360 degree monitoring camera 2b and a sub-region of the standard camera 2c which does not overlap with the former. The selecting portion further comprises an overlapping region between the two camera image streams DK of the monitoring cameras 2b, c. The video image stream VS generated in this manner can then be encoded and transmitted via the network arrangement 11 to the client 4.

The transcoder device 6 has a control interface 16, wherein, on the one hand, control data for controlling the encoding of the video image stream VS can be transferred and, on the other hand, control data for defining the selecting portion 15 can be transferred.

The control data can be generated as follows: the server 3 optionally comprises an auto-configuration module 17 which is designed to analyze the network connection between the server 3 and the client 4 and to transfer a resolution of the video image stream and/or an encoding type of the video image stream VS to the control interface 16 on the basis of the result of the analysis. In this way, the control data are generated on the server side. As an alternative thereto, the client 4 can provide the control data and transfer the same via the network arrangement 11 to the server 4. In this case, the control data would be generated on the client side.

It is furthermore possible for the control data be provided by the server 3 and the client 3. It is thus, e.g., possible that the control data are optionally provided by the server 3 or the client 4 as a function of an operating state. It is also possible for the client 4 and the server 3 to act jointly as follows: the client defines an object in the monitored region U as the target object and specifies the object tracking as an operating mode. The server 3, in particular the auto-configuration module 17 starts the object tracking via the object tracking module and always sets the position of the selecting portion 15 such that the target object is shown in the selecting portion 15. The video image stream VS comprising the target object is transmitted as an encoded video image stream KVS to the client 4.

Figure 3:
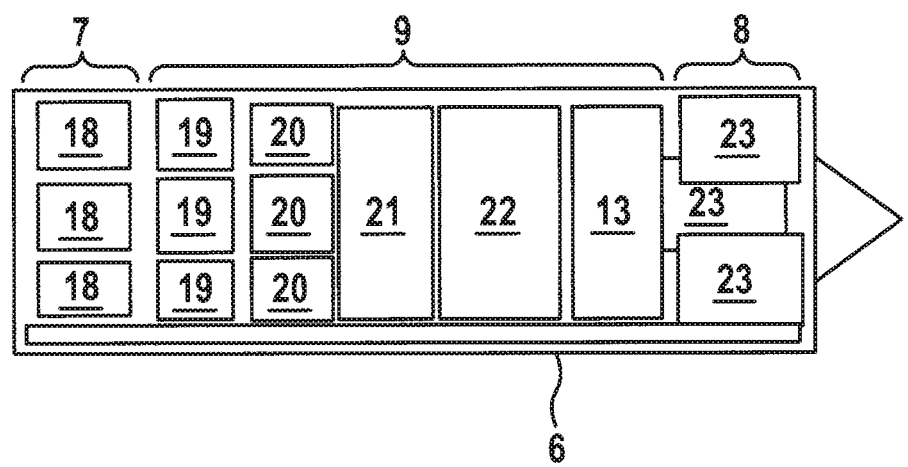
FIG. 3 shows a block diagram of a transcoder device for the client-server architecture in FIG. 1.

FIG. 3 shows a block diagram of a possible exemplary embodiment for the transcoder device 6 in FIG. 1. The transcoder device comprises the input portion 7, the output portion 8 and the processing portion 9. Three decoders are shown in the input portion 7, which decode the encoded camera image streams KK into the decoded camera image streams DK. Three rectification modules 19 are subsequently shown in the signal flow, said rectification modules perspectively rectifying the three decoded camera image streams DK. Video analysis modules 20 are subsequently shown generically, which carry out a content analysis on the rectified camera image data streams DK. A fusion module is denoted with the reference numeral 21 which can evaluate the information from the video analysis modules in an overall view. The transcoder device 6 has optionally further plug-ins 22. The stitching module 13 puts the decoded camera image streams DK together to form one or a plurality of video image streams VS. One or a plurality—in this case three—encoding modules 23 in the output portion 8 encode the video image streams VS to form the encoded video image streams DVS. The encoded video image streams DVS are subsequently outputted.

By means of the architecture depicted, a combination consisting of, on the one hand, a fusing of camera image streams to form a video image stream optionally together with derived items of information and, on the other hand, the encoding of the ROI as a selecting portion from the existing bandwidth or the client-dependent bandwidth of the network connection can be carried out. A user can move by means of the client 4 arbitrarily in and across the existing camera image streams DK even if only a limited bandwidth is available because only the encoded video image stream KVS which has been adapted by the control data is outputted by the transcoder device 6 and/or the server 6. In the simplest case, the selecting portion is provided by a region which is selected by the user via the client 4 and which can be freely moved across the joint sub-section or the modeled sub-section.

The invention claimed is:

1. A transcoder device (6), the transcoder device (6) comprising:
    an input portion (6) for receiving at least two encoded camera image streams (KK) and for decoding the at least two encoded camera image streams (KK), wherein the two camera image streams (DK) show different sub-sections of a monitored region (U);
    an output portion (8) for encoding a video image stream (VS) and for outputting the encoded video image stream (KVS); and
    a processing portion (9) for generating the video image stream (VS) on the basis of the at least two camera image streams (DK), wherein the video image stream (VS) shows a selecting portion (15) of the monitored region (U), the selecting region (15) comprising a sub-region of one sub-section of the monitored region (U) and a sub-region of another sub-section of said monitored region (U) which does not overlap the former sub-region.

2. The transcoder device (6) according to claim 1, wherein the processing portion (9) comprises a stitching module (13) for putting together the at least two camera image streams (DK) to form a joint image data stream, wherein the joint image data stream displays a joint sub-section (14) of the monitored region (U), the selecting region (15) being selected from or formed by the joint sub-section (14).

3. The transcoder device (1) according to claim 1, wherein the processing portion (9) comprises a model module for creating a 3D model of a modeled sub-section of the monitored region, wherein the camera image streams (DK) are projected in correct position as a surface texture onto surfaces of the 3D model, the selecting portion (15) being selected from the modeled sub-section.

4. The transcoder device (6) according to claim 1, wherein the processing portion (9) comprises any selection of the following modules:
    rectification module (19) for rectifying the camera image streams
    video analysis module (20) for the content analysis of the camera image streams
    object tracking module for tracking an object in the monitored region.

5. The transcoder device (6) according to claim 1, further comprising a control interface (16) for receiving control data related to the selecting portion.

6. The transcoder device (6) according to claim 5, wherein the control data is for defining the selecting portion.

7. The transcoder device (6) according to claim 5, wherein the control data is for controlling an operating mode for determining the selecting portion.

8. The transcoder device (6) according to claim 1, further comprising a control interface (16) for receiving control data for controlling the resolution of the video image stream (VS) and/or with regard to the type of encoding of the video image stream (VS).

9. A client-server architecture (1) comprising:
    a server (3), the server (3) including the transcoder device (6) according to claim 1 and a server output interface (10) for outputting the encoded video image stream (KVS),
    a client (4), the client (4) including a client input interface (12) for receiving the encoded video image stream (KVS), and a network arrangement (11), wherein the client (4) is connected to the server (3) via a network connection of the network arrangement (11).

10. The client-server architecture (1) according to claim 9, wherein the client (4) is configured to transmit control data for controlling the resolution of the video image stream, with regard to the type of encoding of the video image stream and/or for defining the selecting portion via the network connection and the server (3) to the control interface (16) of the transcoder device (6).

11. The client-server architecture (1) according to claim 9, wherein the server includes an auto-configuration module (17) which is configured to, using the network connection between the server (3) and the client (4), determine control data for controlling the resolution of the video image stream (VS) and/or with regard to the type of encoding of the video image stream (VS) and to transfer said control data to the control interface (16) of the transcoder device (6).

12. The client-server architecture (1) according to claim 9, wherein the client (4) is configured to transmit control data for controlling an operating mode for determining the selecting portion (15) via the server (3) to the control interface (16) of the transcoder device (6).

13. The client-server architecture (1) according to claim 9, wherein the client-server architecture is configured as a video monitoring system.

\* \* \* \* \*